(No Model.) 2 Sheets—Sheet 1.
B. W. RHODES.
STOCK CAR.
No. 308,928. Patented Dec. 9, 1884.
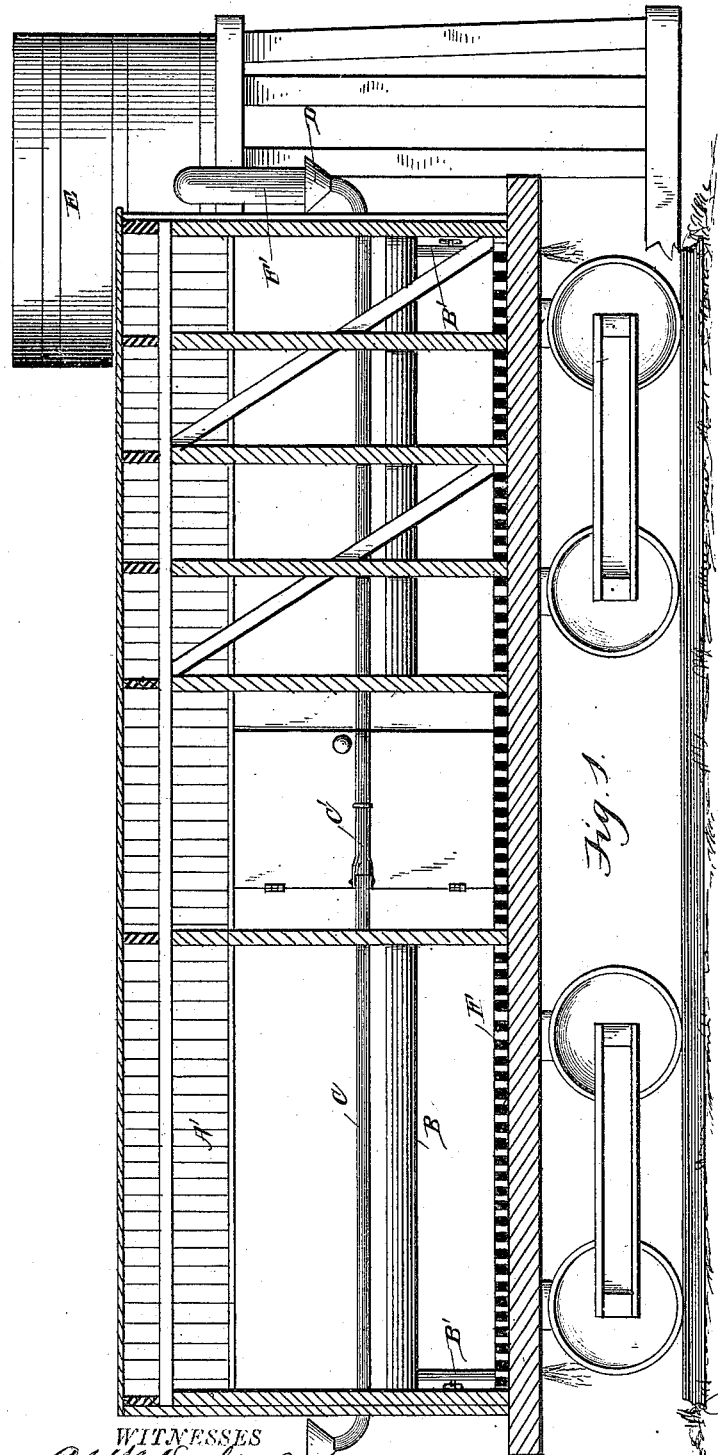
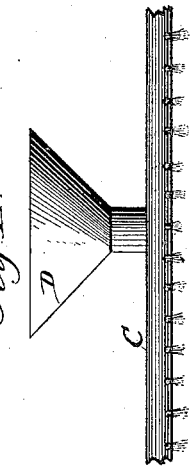
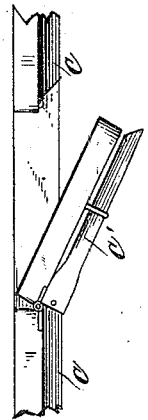

(No Model.) 2 Sheets—Sheet 2.

B. W. RHODES.
STOCK CAR.

No. 308,928. Patented Dec. 9, 1884.

WITNESSES
C. W. Dashiell,
E. G. Siggers.

Benjamin W. Rhodes,
INVENTOR

By C. A. Snow & Co.
Attorneys

UNITED STATES PATENT OFFICE.

BENJAMIN W. RHODES, OF DANVILLE, VIRGINIA, ASSIGNOR, BY DIRECT AND MESNE ASSIGNMENTS, OF PART TO THOMAS A. DANCE AND ROBERT G. PACE, BOTH OF SAME PLACE.

STOCK-CAR.

SPECIFICATION forming part of Letters Patent No. 308,928, dated December 9, 1884.

Application filed September 3, 1884. (No model.)

*To all whom it may concern:*

Be it known that I, BENJAMIN W. RHODES, a citizen of the United States, residing at Danville, in the county of Pittsylvania and State of Virginia, have invented a new and useful Improvement in Stock-Cars, of which the following is a specification, reference being had to the accompanying drawings.

This invention relates to stock-cars; and has for its object means for conveniently feeding and watering the stock while *in transitu.*

The invention consists, essentially, in the combination of the troughs, the perforated water-pipes extended above said troughs, and the means by which the water from the supply-tanks along the railroad may be fed into the perforated pipes, all constructed, combined, and arranged as will be described.

Figure 2:
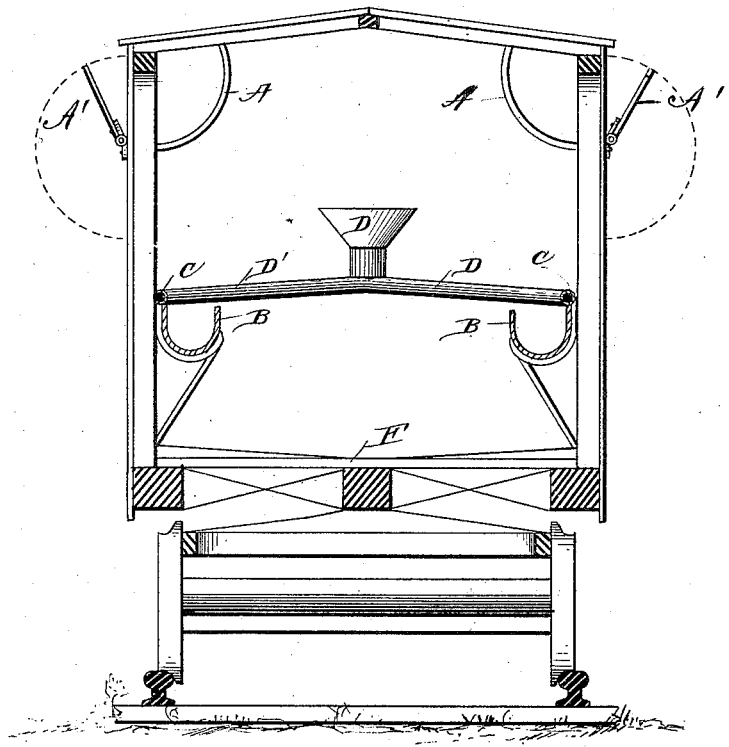
Figure 5:
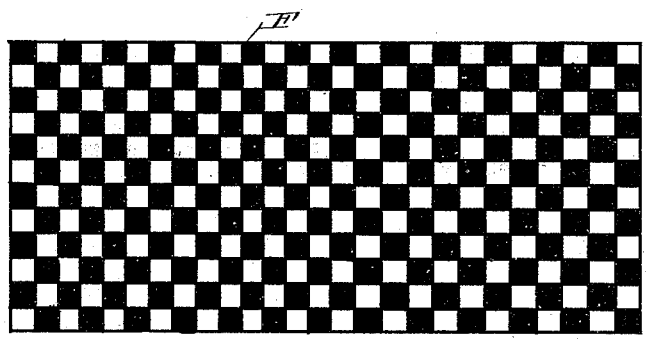

In the drawings, Figure 1 is a longitudinal sectional view of a car provided with my improvements and connected with a tank in the proposed manner. Fig. 2 is a transverse view of the car, partly in section. Fig. 3 shows in detail the joint of the main pipe and its doorway-section. Fig. 4 shows a section of the main pipe with the perforations therein, and Fig. 5 is a detail of a section of the floor.

The car may be of any suitable pattern, and is provided on opposite sides, near its top, with racks A, fitted to receive long hay or fodder, which may be fed thereinto through doors A', formed in the sides of the car and hinged at one edge, so they may be turned out to fill or clean the racks. Along the sides of the car, at a proper distance from the floor, I secure troughs B, which extend from the ends of the car to the doorway. These troughs are provided with one or more escape or waste pipes, B', which may be supplied with suitable valves, in order to retain the water or cut food in the troughs during feeding-time. When cleaning or flushing the troughs, the valves are opened. These troughs, it will be seen, are arranged close to the sides of the car, so corn, chop-feed, and the like may be readily poured thereinto without opening the car. Pipes C C are extended along the sides of the car immediately above the troughs B, and they have perforations formed through their under sides at close intervals. As water is admitted into these pipes it passes out of the perforations into the troughs. I prefer to so fill the troughs or supply water to same because by such arrangement fresh water pours into each part of the trough. These perforations are also desirable because the water flowing therefrom in small streams thoroughly cleanses each part of the troughs when the said troughs are being flushed. I only extend pipes C to the edge of the doorways, at which point I secure to them by the ordinary gas-pipe or bracket joint connecting-sections C', which may be turned up when the door is opened or down, with their outer ends resting in the trough on the other side of the doorway, so as to feed the water into said trough. This joint is most clearly shown in Fig. 3. It will be noticed that the pipes C, terminating on each side of the doorways, are provided with these connecting-sections, so that the water fed into the pipes at either end of the car will be distributed in the troughs the full length of the car.

At each end of the car I arrange a funnel or receiver, D, from the lower end of which pipes D' D' incline downward and outward and connect with the ends of pipes C C. These funnels are fitted to receive the end of the ordinary tank-tube, and are so arranged that said tube can be conveniently inserted, as will be understood from Fig. 1, in which the tube E' of tank E is shown connected with funnel D. By this arrangement the pipes C are quickly filled with water and distribute it properly into the troughs for drinking purposes or to moisten corn, oats, or chop-feed, as may be desirable.

The perforated floor F may be of wood, iron, or net-work, and serves as a ventilating means by which the car is made cooler while in use, and may be more easily cleansed.

By the racks A and doors A' long feed—such as uncut hay and fodder—may be fed when the cars are not in motion, but when moving such feed is dangerous, because of the liability of its becoming ignited from sparks. For this reason I provide troughs for the feeding of grain and chop-stuffs.

By the arrangement of the receivers at each end of the cars two cars may be supplied with water without moving the train. It is therefore necessary to stop the train opposite the tank only once for each two cars, resulting in a considerable saving of time and labor.

Having thus described my invention, what I claim, and desire to secure by Letters Patent, is—

1. In a stock-car, the combination of the troughs B, extending along the sides of the car a suitable distance above the perforated floor thereof, and terminating on opposite sides of the doorway, with the pipes C, arranged above troughs within the car and perforated at close intervals, sections C', arranged across the doorway, attached to the door, swiveled to one end of the pipe C, and closing the other end, the funnels or receivers D D, located at each end of the car, and the pipes D' D', connecting the funnels to the pipes C on opposite sides of the car, arranged and operating as and for the purpose set forth.

2. The stock-car herein described, consisting of the car proper, provided with racks A and doors A' communicating therewith, the troughs B, extended along the sides of the car near its bottom and terminating on opposite sides of the doorway, the pipes C, extended above the troughs B and perforated at close intervals, the sections C', jointed to pipes C, the funnels D D, located one at each end of the car, and the inclined pipes D', connecting said funnels and pipes C, substantially as set forth.

In testimony that I claim the foregoing as my own I have hereto affixed my signature in presence of two witnesses.

BENJAMIN W. RHODES.

Witnesses:
S. W. ARMISTEAD,
JAS. T. CARTER.